Sept. 7, 1937.  M. AITKEN  2,092,040
MOTOR VEHICLE
Filed Nov. 5, 1935  3 Sheets-Sheet 1

INVENTOR.
Murray Aitken
BY
ATTORNEYS.

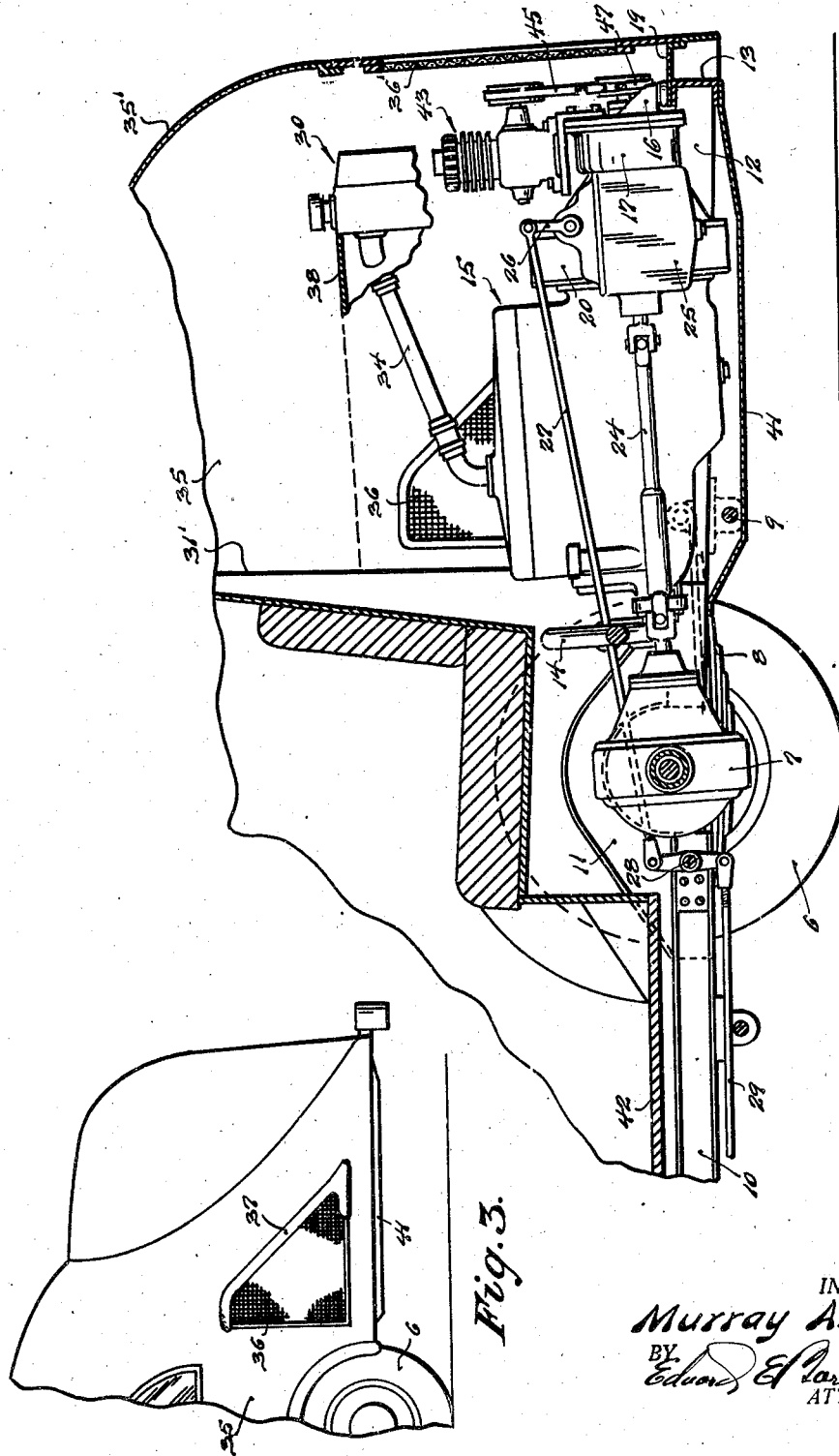

Sept. 7, 1937.　　　　M. AITKEN　　　　2,092,040
MOTOR VEHICLE
Filed Nov. 5, 1935　　　3 Sheets-Sheet 3
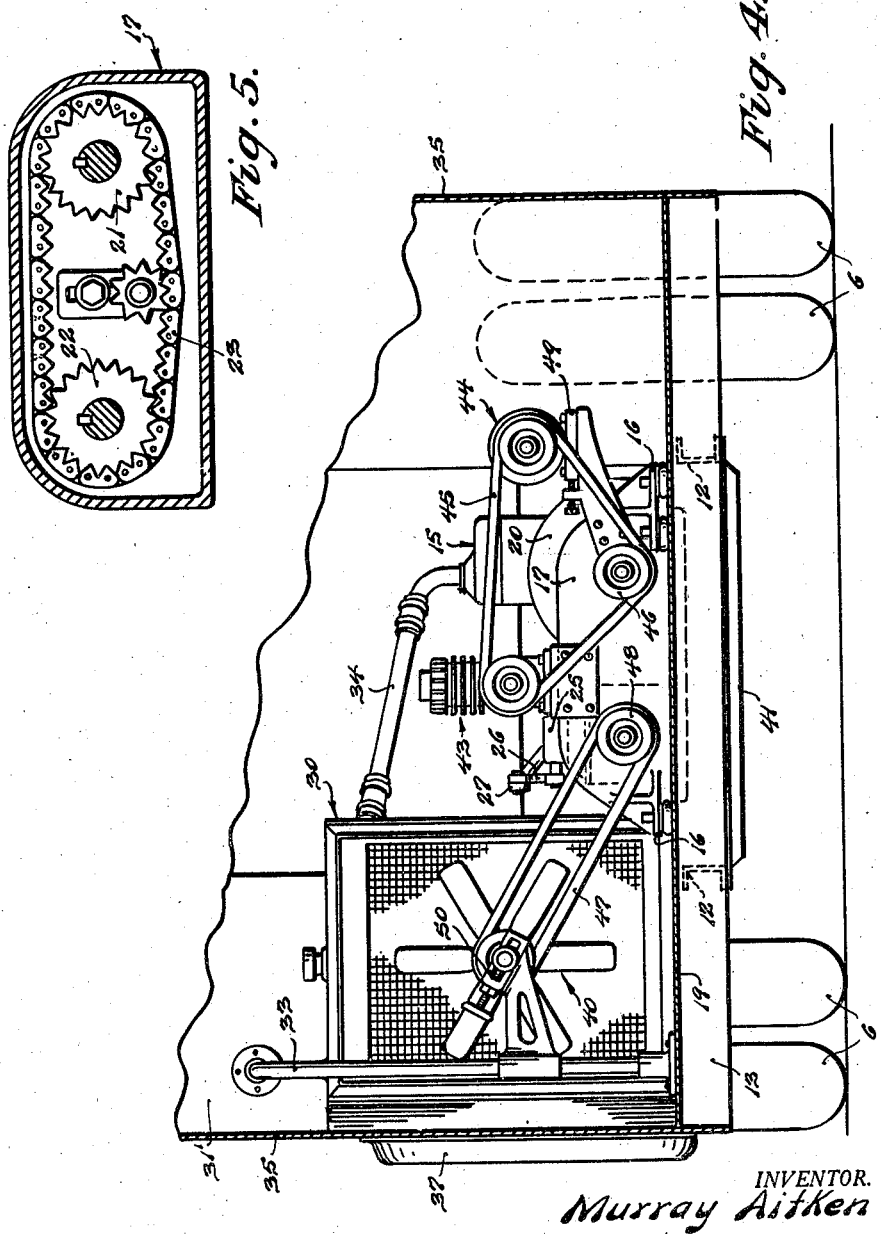
INVENTOR.
Murray Aitken
BY
ATTORNEYS.

Patented Sept. 7, 1937

2,092,040

UNITED STATES PATENT OFFICE 2,092,040

MOTOR VEHICLE

Murray Aitken, Seattle, Wash., assignor to Kenworth Motor Truck Corporation, Seattle, Wash., a corporation of Washington Application November 5, 1935, Serial No. 48,311

9 Claims. (Cl. 180—54)

My invention relates to motor vehicles and particularly to that character of vehicle in which the drive or power unit is disposed to the rear of the differential assembly, the invention being directed to improvements over the structural arrangement disclosed in the pending patent application of Lloyd A. Mallett, filed November 6th, 1934, Serial Number 751,723.

Similarly to the pending application above identified, the present invention aims to provide a more compact assembly of the power plant and associated drive mechanism than has previously been obtained whereby to reduce the over-all length of the assembly and additionally purposes to effect a lowering of the over-all height and generally effect a more advantageous association of the co-active parts to render the parts stronger and more accessible.

Difficulties encountered in cooling motor units mounted in the rear of a vehicle has been a prime deterrent to the use of this character of motor assembly and it is a further and particular object to devise a cooling arrangement peculiarly designed to overcome these objections.

Further objects and advantages, together with the foregoing, will become apparent in the course of the following detailed description and in the claims annexed thereto, the invention consisting in the novel construction, adaptation, and combination of parts hereinafter described and claimed.

In the drawings:

Fig. 2 is a longitudinal vertical section taken on the section line 2—2 of Fig. 1.

Fig. 3 is a detail side elevation of the rear end of the vehicle, taken to a reduced scale.

Fig. 4 is a transverse vertical section taken on the line 4—4 of Fig. 1; and

Fig. 5 is a detail transverse vertical section taken on the line 5—5 of Fig. 1 to indicate the transfer gear-and-chain employed between the power plant and the transmission.

Figure 1:
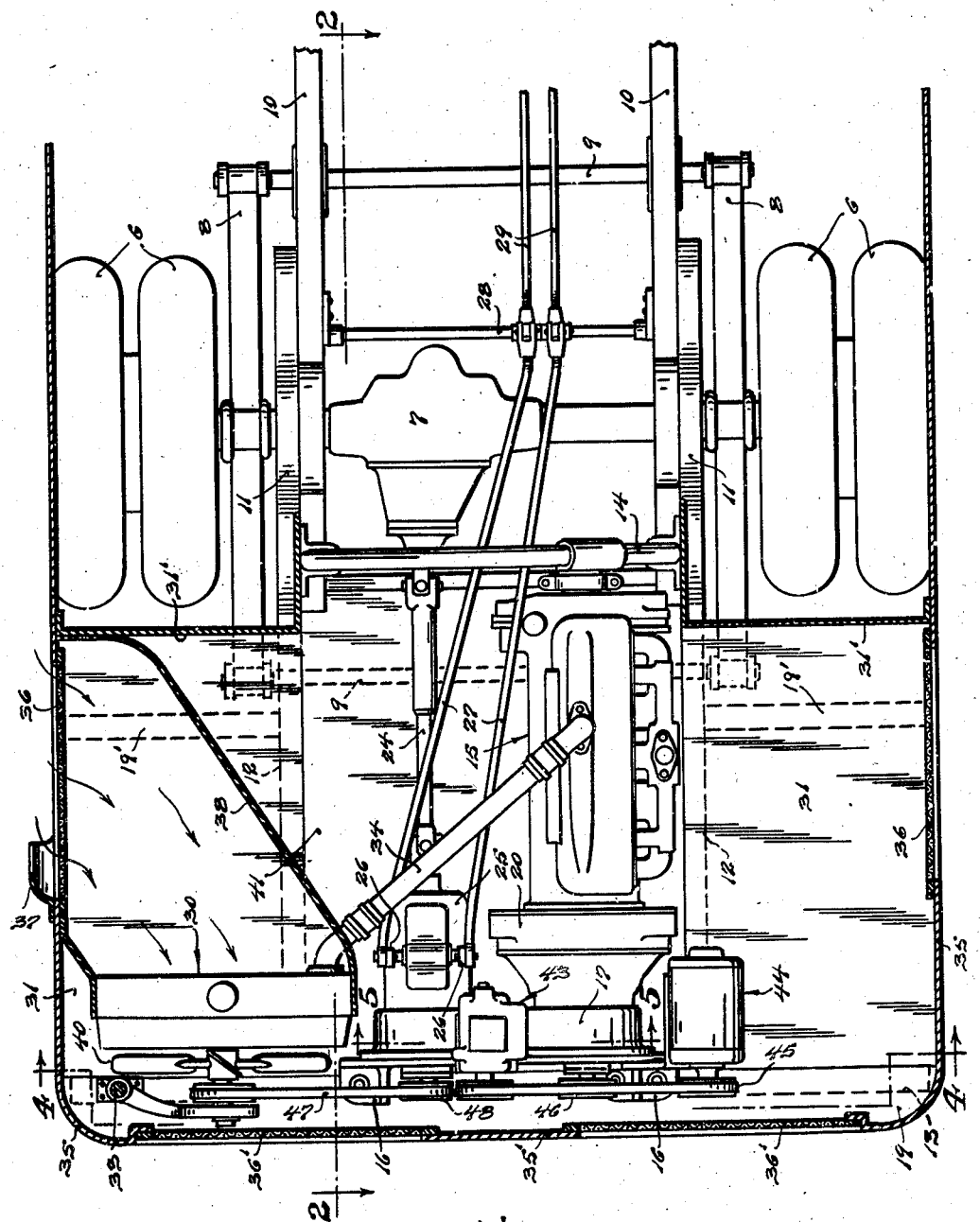
Figure 1 is a fragmentary top plan view representing the now preferred embodiment of the invention, the frame and body of the vehicle forwardly of the rear wheels being omitted and that portion of the body designed with especial reference to the power plant assembly being shown in horizontal section.

In carrying out the invention, reference being had to the drawings, the numeral 6 indicates the rear wheels of a vehicle of the passenger-bus character in which the rear seat is disposed to overlie the differential housing 7, the differential housing being of conventional design except that the same is reversely disposed and located in laterally off-set relation to the longitudinal center line of the vehicle. As in ordinary practice, the tube extensions for the axle which lead from the differential to the wheels 6 are resiliently coupled to the vehicle frame by springs 8 and the coupling rods 9 lying between the spring ends and the frame being disposed transversely across the vehicle frame. The vehicle frame, employing welding, is constituted of longitudinal channel members 10 having arched kick-ups 11 extending over the axle housings with channel extensions 12 projecting rearwardly from the kick-ups to the rear limits of the vehicle, a transverse channel 13 at the rear end of the vehicle acting together with a bar 14 of an inverted-V form as frame bolsters for the channel extensions 12. Said bolster members, the bar 14 being located in proximity of but spaced slightly to the rear of the differential, operate in conjunction to support a power plant such as indicated by 15, the front mounting for said power plant comprising an annular collar supported by the bar 14 to off-set the motor laterally from the longitudinal median line of the vehicle frame to the side opposite that of the differential and the rear being bolted with the mounting comprising lugs 16 carried by a transfer case 17 to fit over rubber blocks which are interposed between the flange-forming lugs and an angle-iron member 19 overlying the channel 13. The angle-iron 19 extends the width of the vehicle and co-acts with angle-iron braces 19' extending outwardly from the rear ends of the kick-up plates to form secondary frames at the rear of the vehicle disposed laterally of the channel extensions 12 of the main frame.

Having particular reference to the power plant assembly, the motor 15 of which lies horizontally or nearly horizontal in a longitudinal vertical plane off-set from the median line of the vehicle, a conventional clutch and housing 20 therefor are supported between the motor and the transfer case 17. Housed by said transfer case are a pair of transversely spaced and horizontally aligned sprocket wheels 21 and 22 (Fig. 5) which operate through the median of a silent chain 23 to transfer power from the motor through the gears of a transmission assembly to a torque shaft 24 which connects with the differential gearing, the transmission being carried in a housing 25 laterally spaced from the motor and disposed forwardly of the transfer case in the longitudinal vertical plane of the differential. Conventional universals are employed between the transmission and the differential.

Any suitable or desired control is utilized in the operation of the clutch and the transmission is indicated as being controlled by a pair of exposed levers 26 operatively connected with the transmission gearing and pivotally actuated for selectively meshing the latter under the influence of respective rods 27 extending forwardly over the inner end of the differential housing to engage the upper arms of levers fulcrumed as at 28 to the vehicle frame, the lower arms of the fulcrumed levers connecting with control rods 29 which extend to the driver's compartment for operation by a gear-shifting lever (not shown).

In the cooling system for the motor is a conventional radiator 30 which is mounted in the approximate transverse vertical plane of the transfer case on a floor 31 carried by the secondary frame of the vehicle which lies on the transmission side of the motor assembly. This supporting floor preferably lies flush with the upper surface of the frame members 12 and, for bracing the radiator, a strut 33 of a general L shape is brought upwardly and over the radiator from the angle-iron 19, the horizontal arm of the strut being anchored to a vertical forward wall 31' disposed to the rear of the vehicle wheels 6. Hose connections, as 34, extend from the radiator to the water jackets of the motor with the water pump being carried at the forward end of the motor in the path of circulation of the water through the water jackets.

Indicated by 35 and 35' are the side and rear body walls of the vehicle and provided thereby to obtain circulation of air through the motor compartment are screened openings 36 and 36', the body side wall which lies adjacent the radiator being provided along the rear edge of the screened opening with an exteriorly disposed hood 37 protruding slightly from the surface of the vehicle body to trap air in directing the same through the opening. Between said opening and the radiator, I provide a tunnel 38 shielded from the motor compartment. Circulation of air through the tunnel is influenced by a fan 40 carried by the strut 33 to locate the fan to the rear of the radiator whereby a certain degree of air circulation is obtained through the screened opening lying at the opposite side of the compartment.

To obtain a circulation of air through the motor compartment in advancing the radiation of heat from the walls of the motor, I have devised an especially effective arrangement which peculiarly co-acts with the shielded tunnel in that it offsets the loss of air circulation normally drawn by the fan over the motor, the arrangement consisting in providing a depressed pan 41 under the motor extending between the frame channels 12 in a plane below that of the forwardly disposed passenger floor 42, the space about the axle and differential housings between the forward lip of the pan and the floor level of the vehicle's passenger compartment defining a relative air funnel. Said air funnel, under the influence of vehicle momentum, acts to force a current of air past the motor.

Motor accessories such as an air compressor and a generator are indicated at 43 and 44, said accessories being pulley-driven by an endless belt 45 passing about a pulley 46 fast to the drive shaft actuated by the driven clutch plate, a similar drive to the fan 40 comprising a belt 47 driven from a pulley 48 fast to the shaft driven by the sprocket wheel 22. Suitable take-ups for the belts are shown at 49 and 50.

While not shown in the drawings, the body wall to the rear of the motor compartment is hinged above the motor to allow the same to be lifted as a relative door for exposing the motor.

It is my intention that the invention be limited only by the scope of the hereto, annexed claims.

What I claim, is:—

1. In a rear-drive motor vehicle, in combination with a vehicle frame, and a rear axle assembly including a reversely disposed differential off-set from the central longitudinal line of the vehicle frame, said frame providing longitudinally spaced transverse bolsters to the rear of the rear axle assembly, a motor supported by said bolsters to extend longitudinally of the vehicle in a plane off-set from the central longitudinal line of the frame to the side opposite that of the differential, change-gear mechanism disposed laterally of the motor in the longitudinal line of the differential, connection from the rear end of the motor to the rear end of the change-gear mechanism, and connection including universals from the forward end of the change-gear mechanism to the differential.

2. In a rear-drive motor vehicle, in combination with a rear axle assembly including a reversely disposed differential off-set from the central longitudinal line of the vehicle, and a vehicle frame including lateral girders projected longitudinally of the vehicle and extending rearwardly of the rear axle assembly, said rearwardly extended portion of the vehicle frame having longitudinally spaced transverse bolsters extending between the girders, a motor, a power transmitting assembly for said motor comprising change-gear mechanism disposed laterally of the motor and transfer mechanism extending transversely from the rear end of the motor to the rear end of the change-gear mechanism, housings for said change-gear and transfer mechanism connected one with another and with the motor block, connections between the forward end of the motor and the forward bolster and between the housing for said transfer mechanism and the rear bolster for supporting the motor and the power transmitting assembly to locate the transmission in the longitudinal line of the differential, and a torque shaft connecting the forward end of the transmission with the differential.

3. In a motor vehicle in which the motor is mounted to the rear of the driven axle, the combination of a driven axle assembly including a rearwardly directed differential off-set from the longitudinal center line of the vehicle, change-gear mechanism disposed to the rear of and in the longitudinal line of the differential, flexible drive connection between said change-gear mechanism and the differential, a motor disposed laterally of the change-gear mechanism and off-set from the longitudinal center line of the vehicle to the side opposite that of the differential, said motor having its power-output end directed conversely to that of the change-gear mechanism, and transfer mechanism from said power-output end of the motor to the change-gear mechanism.

4. In a rear-drive motor vehicle, in combination with a rear axle assembly including a reversely disposed differential, a motor, change-gear mechanism, means supporting said motor and change-gear mechanism to locate the same to the rear of the rear axle assembly in parallel planes disposed laterally of one another and with the change-gear mechanism lying in the longitudinal line of the differential, a drive connection including universals from the forward end of the change-gear mechanism to the differential, and a drive connection comprising transfer mechanism extending transversely of the vehicle for connecting the rear end of the motor with the rear end of the change-gear mechanism.

5. In a rear-drive motor vehicle, in combination with a rear axle assembly including a reversely disposed differential off-set from the central longitudinal line of the vehicle, and a vehicle main frame including lateral girders projected longitudinally of the vehicle and rearwardly of the rear axle assembly and provided to the rear of said rear axle assembly with longitudinally spaced front and rear transverse bolsters, a motor and a power transmitting assembly including change-gear mechanism supported by said bolsters to locate the motor and change-gear mechanism laterally of one another at opposite sides of the central longitudinal line of the vehicle with the change-gear mechanism lying in the longitudinal line of the differential, a torque shaft from the change-gear mechanism to the differential, secondary frames to the rear of the rear axle assembly at each side of the vehicle main frame, a radiator supported by the secondary frame lying to the change-gear side of the vehicle, connection from the radiator to the motor, a vehicle body providing walls at each side and to the rear of the vehicle's rear extension having screened openings for the circulation of air through the motor compartment defined by the walls, a shielded tunnel leading to the radiator from the opening in the side wall adjacent the radiator, an exterior hood to the rear of the opening for trapping air passing the opening under the influence of vehicle travel, and a motor-driven fan mounted to the rear of the radiator for drawing the trapped air through the tunnel and the core of the radiator.

6. The structure as defined in claim 5 wherein the motor compartment is open at its forward end and between the side girders is provided with a pan extending below the motor assembly to obtain a forced circulation of air under the influence of vehicle travel into the forward end of the motor compartment to co-act with the fan-induced current of air in cooling the motor.

7. A frame for a rear-drive motor vehicle in which the motor is mounted to the rear of the rear axle assembly comprising a main frame including longitudinally extending lateral girders disposed interiorly of the longitudinal lines of the vehicle wheels and projecting to the rear of the rear axle assembly a distance approximating the length of the vehicle motor, a motor-supporting bolster of a general inverted V shape at the forward end of said rear extension projected transversely across the girders, a rear motor-supporting bolster comprising a horizontal member extending the width of the vehicle at the rear limits of the side girders, and horizontal brace members extending outwardly from said side girders at the forward end of the rear extension to co-act with the lateral extensions of the rear bolster in forming secondary frames at each side of the rear extension of the vehicle's main frame.

8. In a motor vehicle of the character in which the motor is mounted to the rear of the rear axle, the combination with a rear axle assembly including a reversely disposed differential, and a vehicle body providing a motor compartment to the rear of the rear axle, a motor and power transmitting mechanism supported in said motor compartment and connected with the differential for driving the rear axle, screened openings in the rear wall and a side wall of the motor compartment, a water-cooling system for the motor including a radiator supported within the motor compartment in laterally off-set relation to the motor, a tunnel shielded from the motor compartment and leading to the radiator from the side-wall opening, a motor-driven fan for drawing air through said tunnel to cool the radiator, and means operating under the influence of vehicle travel to obtain a forced circulation of air over the motor to co-act with the water-cooling system for cooling the motor.

9. In a motor vehicle of the character in which the motor is mounted to the rear of the rear axle, the combination with a rear axle assembly providing a reversely disposed differential, and a vehicle body providing a motor compartment to the rear of the rear axle, a motor and power transmitting mechanism supported in said motor compartment and connected with the differential for driving the rear axle, screened openings in the rear wall and a side wall of the motor compartment for admitting cooling air to and delivering heated air from the compartment, respectively, a water-cooling system for the motor providing a radiator supported within the motor compartment, a tunnel shielded from the motor compartment and leading to the radiator from said side-wall opening for concentrating the incoming stream of cooling air on the core of the radiator, and a motor-driven fan for drawing air through said tunnel.

MURRAY AITKEN.